(12) United States Patent
Binnig et al.

(10) Patent No.: US 7,227,829 B2
(45) Date of Patent: Jun. 5, 2007

(54) MECHANICAL DATA PROCESSING

(75) Inventors: Gerd K. Binnig, Wollerau (CH);
Walter Haberle, Waedenswil (CH)

(73) Assignee: International Business Machines Corp, Armonk, NY (US)

( * ) Notice: Subject to any disclaimer, the term of this patent is extended or adjusted under 35 U.S.C. 154(b) by 534 days.

(21) Appl. No.: 10/628,813

(22) Filed: Jul. 28, 2003

(65) Prior Publication Data
US 2004/0071021 A1  Apr. 15, 2004

(30) Foreign Application Priority Data
Jan. 15, 2002  (WO) .................. PCT/IB02/00116

(51) Int. Cl.
G11B 9/00  (2006.01)
G11C 7/00  (2006.01)

(52) U.S. Cl. .......................... 369/126; 365/200
(58) Field of Classification Search ............. None
See application file for complete search history.

(56) References Cited

U.S. PATENT DOCUMENTS

| | | | |
|---|---|---|---|
| 3,262,122 A | | 7/1966 | Fleisher et al. |
| 3,866,187 A | * | 2/1975 | Dougherty et al. .......... 365/125 |
| 4,599,718 A | * | 7/1986 | Nakagawa et al. .......... 369/100 |
| 4,761,253 A | * | 8/1988 | Antes ........................ 264/1.31 |
| 5,307,311 A | | 4/1994 | Sliwa .......................... 365/174 |
| 5,329,122 A | * | 7/1994 | Sakai et al. .................. 250/306 |
| 5,557,596 A | * | 9/1996 | Gibson et al. ............... 369/101 |
| 5,751,683 A | | 5/1998 | Kley ........................... 369/126 |
| 5,835,477 A | * | 11/1998 | Binnig et al. ................ 369/126 |
| 5,936,243 A | * | 8/1999 | Gibson et al. ............... 250/306 |
| 6,101,164 A | * | 8/2000 | Kado et al. .................. 369/126 |
| 7,126,897 B2 | * | 10/2006 | Takeuchi et al. .......... 369/47.53 |
| 2003/0081532 A1 | * | 5/2003 | Gibson ........................ 369/126 |
| 2004/0114490 A1 | * | 6/2004 | Antonakopoulos et al. . 369/101 |
| 2004/0136277 A1 | * | 7/2004 | Binnig et al. ............. 369/13.14 |
| 2005/0281174 A1 | * | 12/2005 | Gotsmann et al. .......... 369/126 |

FOREIGN PATENT DOCUMENTS

| | | |
|---|---|---|
| GB | 1474199 | 5/1977 |
| JP | 04-289580 | 10/1992 |
| JP | 08-297870 | 11/1996 |
| JP | 08/297870 A | 11/1996 |
| WO | WO 02061734 A2 * | 8/2002 |
| WO | WO 2004003909 A1 * | 1/2004 |
| WO | WO 2004049323 A1 * | 6/2004 |

* cited by examiner

Primary Examiner—William Korzuch
Assistant Examiner—Parul Gupta
(74) Attorney, Agent, or Firm—Richard M. Goldman

(57) ABSTRACT

Described is a method for erasing data recorded in a data storage device in which a data bit is written onto a surface by applying a first combination of energy and force to the surface via a tip to form a pit in the surface representative of the data bit by local deformation of the surface. The method comprises applying a second combination of energy and force via the tip to prerecorded deformations of the surface to be erased to substantially level the surface.

12 Claims, 5 Drawing Sheets

MECHANICAL DATA PROCESSING

The present invention generally relates to mechanical data processing and particularly relates to erasing data recorded in a mechanical data storage device in which a data bit is written onto a surface by supplying energy to a tip biased against the surface to form, by local deformation of the surface, a pit therein which is representative of the data bit.

An example of a such a storage device is described in "The Millipede"—More than one thousand tips for future AFM data storage", P. Vettiger et al, *IBM Journal of Research and Development*. Vol. 44 No. 3, May 2000. As described therein, this device comprises a two dimensional array of cantilever sensors fabricated on a silicon substrate. Each cantilever is attached at one end to the substrate. The other end of each cantilever carries a resistive heater element and an outward facing tip. Each cantilever is addressable via row and column conductors. The row and column conductors permit selective passage of electrical current through each cantilever to heat the heating element thereon.

In both reading and writing operations, the tips of the array are brought into contact with and moved relative to a storage medium comprising a polymer film coating a plane substrate.

Data is written to the storage medium by a combination of applying a local force to the polymer layer via each tip and selectively heating each tip via application of data signals through the corresponding row and column conductors to a level sufficient to locally deform the polymer layer, thereby causing the tip to penetrate the surface of polymer layer and leave an indentation or pit.

Each heating element also provides a thermal read back sensor because it has a resistance which is dependent on temperature. For data reading operations, a heating signal is applied sequentially to each row in the array. The heating signal heats heating elements in the selected row, but now to a temperature which is insufficient to melt the polymer film. The thermal conductance between the heating elements and the storage medium varies according to distance between the heating elements and the storage medium. When the tips move into bit indentations as the array is scanned across the storage medium, the distances between the heating elements and the storage medium reduce. The medium between the heating elements and the storage medium transfers heat between the heating elements and the storage medium. Heat transfer between each heating element and the storage medium becomes more efficient when the associated tip moves in an indentation. The temperature and therefore the resistance of the heating element therefore reduces. Changes in temperature of the continuously heated heating elements of each row can be monitored in parallel, thereby facilitating detection of recorded bits.

The storage medium can be thermally erased and then rewritten multiple times. Conventionally, to erase the storage medium, the polymer layer is heated to beyond its melting point for a few seconds. The heating reflows the polymer layer thereby removing all indentations recorded in the storage medium. It would also be desirable to permit selective erasing of only a one or a subset of the indentations recorded on the storage medium.

In accordance with the present invention, there is now provided a method for erasing data recorded in a data storage device in which a data bit is written onto a surface by applying a first combination of energy and force to the surface via a tip to form a pit in the surface representative of the data bit by local deformation of the surface, the method comprising applying a second combination of energy and force via the tip to prerecorded deformations of the surface to be erased to substantially level the surface.

The present invention advantageously permits selective erasing a single one or a subset of a plurality of data bits recorded on the surface.

The force applied in the first combination may be greater than the force applied in the second combination. Similarly, the energy applied in the first combination is greater than the energy applied in the second combination. In a preferred embodiment of the present invention, the energy applied in the first and second combinations comprises heat. In a particularly preferred embodiment of the present invention, the method comprises forming new pits overlapping deformations representative of prerecorded data to be erased to substantially level the surface.

The forming of new pits preferably comprises offsetting the new pits relative to the deformations representative of the prerecorded data to be erased. The forming of new pits may further comprise forming a line of new pits in which each pit overlaps the immediately preceding pit.

In a preferred embodiment of the present invention, unwanted data bits are erased by overwriting them with a greater density of new data bits so that each new data bit effectively erases the immediately preceding data bit. The erasure need not be total. Some residual surface relief may remain. It is sufficient that an erased bit is not detected as a data bit by the reading mechanism. This will of course depend on data reading sensitivity. In some embodiments of the present invention, it may be acceptable for the last new bit in a sequence written to erase an unwanted data sequence to form part of new data to be recorded. In other embodiments of the present invention, the density at which new bits are written to erase unwanted bits may be such that no new bits remain recorded in the surface.

Viewing the present invention from another aspect, there is provided a data processing system comprising: a data storage surface; a tip in contact with the surface and moveable relative thereto; and a controller operable, in a write mode, to apply a first combination of energy and force to the surface via a tip to form a pit in the surface representative of the data bit by local deformation of the surface and, in an erase mode, to apply a second combination of energy and force via the tip to prerecorded deformations of the surface to be erased to substantially level the surface.

Preferred embodiments of the present invention will now be described, by way of example only, with reference to the accompanying drawings, in which.

Figure 1:
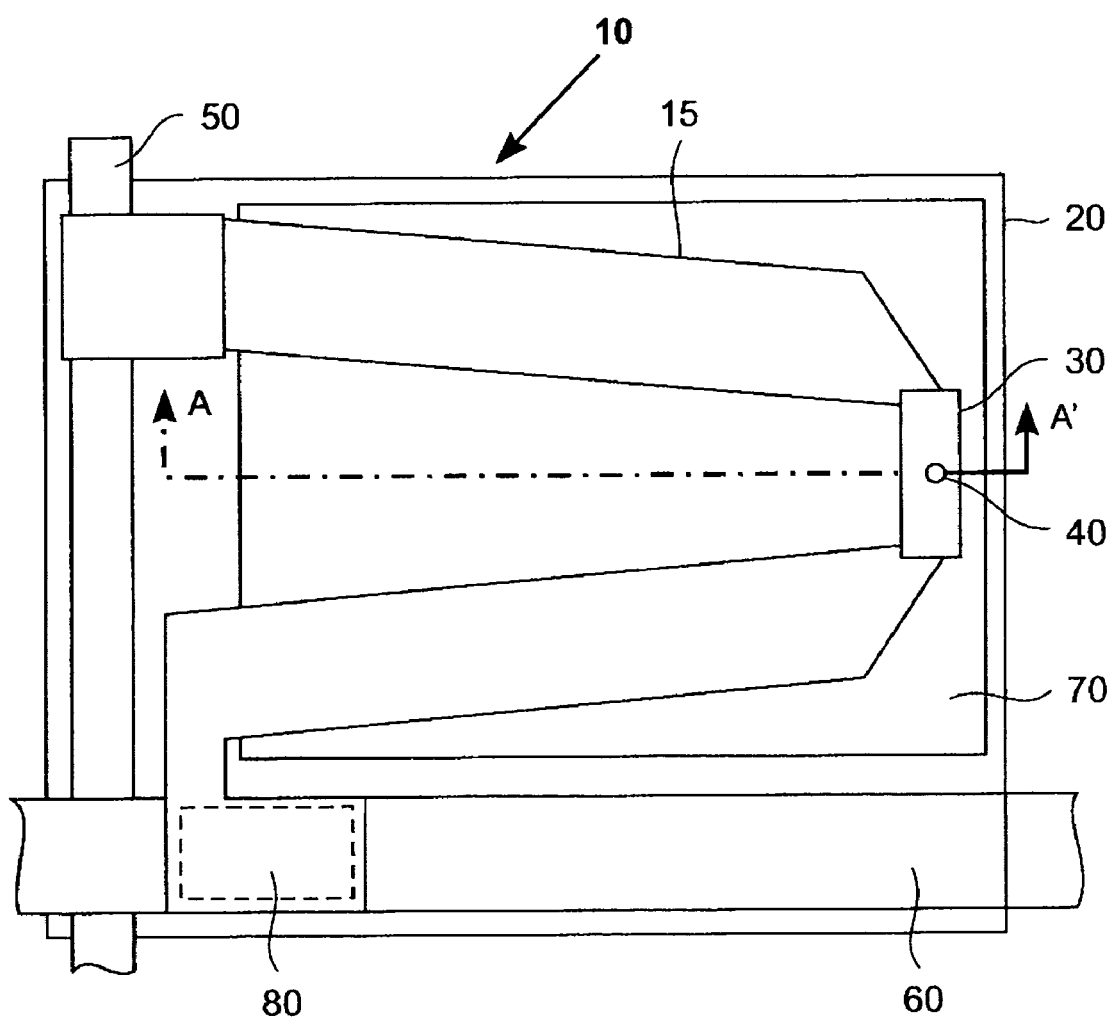
FIG. 1 is a plan view of a sensor of a data storage device embodying the present invention.

Referring first to FIG. 1, an example of a data storage system embodying the present invention comprises a two dimensional array of cantilever sensors 10 disposed on a substrate 20. Row conductors 60 and column conductors 50 are also disposed on the substrate. Each sensor 10 is addressed by a different combination of a row conductor 60 and a column conductor 50. Each sensor 10 comprises a U-shaped silicon cantilever 15 of a length in the region of 70 um and thickness in the region of um. Limbs of the cantilever 15 are fixed, at their distal ends, to a silicon substrate 20. The apex of the cantilever 15 resides in a recess 70 formed in the substrate 20 and has freedom for movement in a direction normal to the substrate 20. The cantilever 15 carries, at its apex, a resistive heater element 30 and a silicon tip 40 facing away from the substrate 20. The limbs of the cantilever 15 are highly doped to improve electrical conductance. The heater element 30 is formed by doping the apex of the cantilever 15 to a lesser extent, thereby introducing a region of increased electrical resistance to current flow through the cantilever 15. One of the limbs of the cantilever 15 is connected to a row conductor 60 via an intermediate diode 80. The other limb of the cantilever 15 is connected to a column conductor 50. Row conductor 60, column conductor 70, and diode 80 are also disposed on the substrate 20. The cantilever 15 is pre-stressed to resiliently bias the tip away from the substrate 20.

Figure 2:
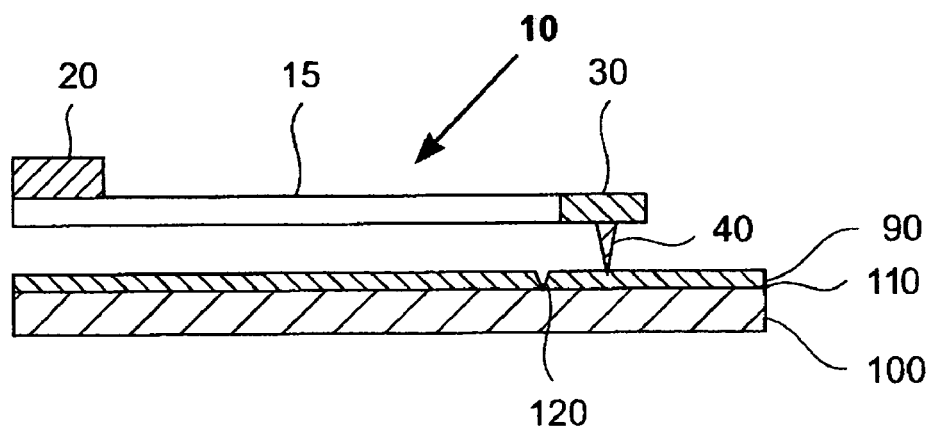
FIG. 2 is a cross-sectional view of the sensor when viewed in the direction of arrows A–A'.

Referring now to FIG. 2, the tip 40 is urged against a planar storage medium in the form of a polymer layer 90 such as a film of polymethylmethacrylate (PMMA) of a thickness in the region of 40 nm. The tip 40 may be mechanically biased towards the surface. However, in other embodiments of the present invention, different types of bias may be employed to urge the tip 40 against the surface. The polymer layer 90 is carried by a silicon substrate 100. An optional buffer layer 110 of cross-linked photo-resist such as SU-8 of a thickness in the region of 70 nm is disposed between the polymer layer 90 and the substrate 100. In both reading and writing operations, the tip 40 of the array is across the surface of the storage medium. In writing operations, the array of tips can be moved relative to the storage medium to enable writing of data over an area of the polymer layer 90.

Data is written to the storage medium by a combination of applying a local force to the polymer layer 90 via the tip and applying energy to the surface in the form of heat via the tip 40 by passing a write current through the cantilever 15 from the corresponding row conductor 60 to the corresponding column conductor 50. Passage of current through the cantilever 15 causes the heater element 30 to heat up. Heat energy is passed from the heater element 30 into the tip 40 via thermal conductance.

Figure 3:
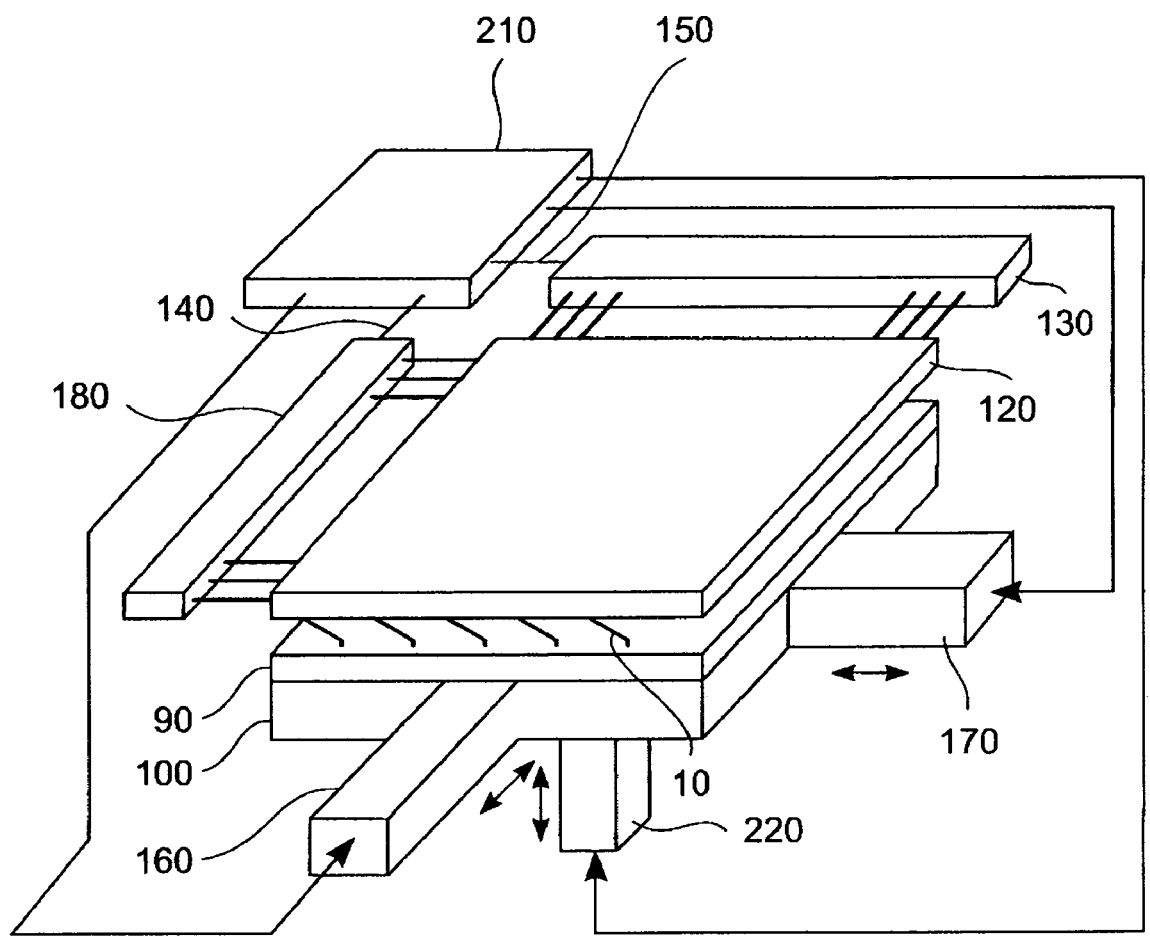
FIG. 3 is an isometric view of the data storage device.

With reference to FIG. 3, each of the row conductors 60 is connected to a separate line of row multiplexer 180. Similarly, each of the column conductors 50 is connected to a separate line of a column multiplexer 130. Data and control signals are communicated between a controller 210 and the row and column multiplexers 180 and 130 via control lines 140 and 150 respectively. The storage medium 90 can be moved in a controlled manner relative to the array in orthogonal directions via positioning transducers 160, 170, and 220. Transducers 160 and 170 effect movement of the array in a plane parallel to the surface of the polymer layer 90. Transducer 220 effects movement of the array in a direction perpendicular to the array. In operation, the controller 210 generates write signals for driving the array during writing operations, read signals for driving the array during read operations, and positioning signals for driving the transducers 160, 170, and 220 to control movement of the tips in the array relative to the surface of the polymer layer 90. The controller 210 also receives outputs from the array during read operations. In particularly preferred embodiments of the present invention, transducers 160, 170, and 220 are implemented by piezoelectric transducers, electromagnetic transducers, or a combination thereof. However, it will be appreciated that other implementations are possible. The controller 210 may be implemented by a microprocessor, micro-controller or similar control device or collection of control devices.

Figure 4:
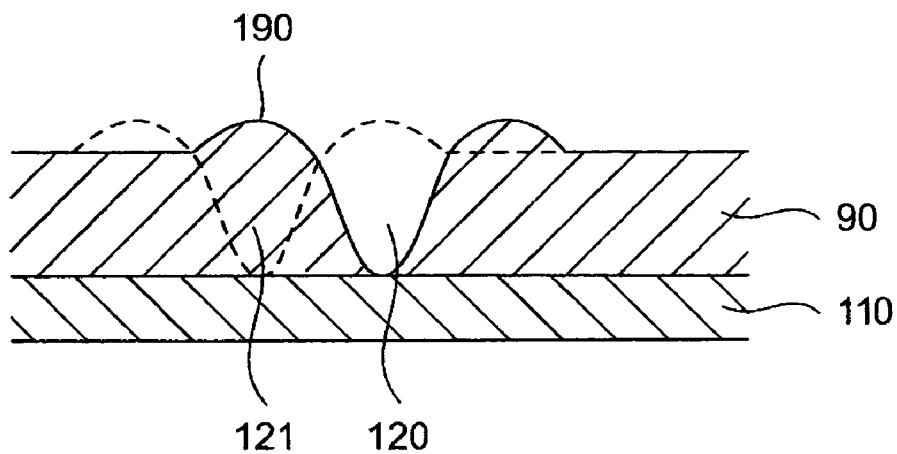
FIG. 4 is a cross-sectional view of a storage medium of data storage system after a write operation.

With reference to FIG. 4, the write current is selected to heat the tip 40 to a level sufficient to locally deform the polymer layer 90, thereby causing the tip 40 to indent the surface of the polymer layer 90 and leave a pit 120 of a diameter in the region of 40 nm. By way of example, it has been found that local deforming of a PMMA film can be achieved by heating the tip 40 to a temperature of the order of 700 degrees centigrade. The optional buffer layer 110 has a higher melting point than the PMMA film 90 and therefore acts as a penetration stop to prevent abrading of the tip 40 against the substrate 90. The pit 120 is surrounded by a ring 190 of polymer material raised above the polymer layer 90. A second, overlapping pit 121 is shown in phantom dotted lines.

The heating element 30 also provides a thermal read back sensor because it has a resistance which is dependent on temperature. For data reading operations, a heating current is passed though the cantilever 15 from the corresponding row conductor 60 to the corresponding column conductor 50. Accordingly, the heating element 40 is again heated, but now to a temperature which is insufficient to deform the polymer layer 90. Reading temperatures of the order of 400 degrees centigrade are, for example, insufficient to melt a PMMA film, but nevertheless provide acceptable reading performance. The thermal conductance between the heating element 30 and the polymer layer 90 varies according to distance between the heating element and the polymer layer 90. During a reading operation, the tip 40 of is scanned across the surface of the polymer film 90. This is achieved by moving the array relative to the polymer film 90. When the tip 40 moves into a pit 120, the distances between the heating element 30 and the polymer layer 90 reduce. The medium between the heating element 30 and the polymer layer 90 transfers heat between the heating element 40 and the polymer layer 90. Heat transfer between the heating element 30 and the polymer layer 90 more efficient when the tip 40 moves in the indentation 120. The temperature and therefore the resistance of the heating element 30 therefore reduces. Changes in temperature of the continuously heated heating element 30 row can be monitored in parallel, thereby facilitating detection of recorded bits.

The aforementioned heating current is produced by applying a heating voltage pulse to the corresponding row conductor 60. Accordingly, a heating current flows through each sensor 10 connected to the row conductor 60 to which the heating voltage pulse is applied. All the heating elements 30 in the corresponding row of the array are therefore heated. Recorded data is then read out from in parallel from the heated row of sensors 10. Each row of the array is thus read sequentially according to a multiplexing scheme. In a preferred embodiment of the present invention, the storage medium provides a 3 mm×3 mm storage surface.

Figure 5:
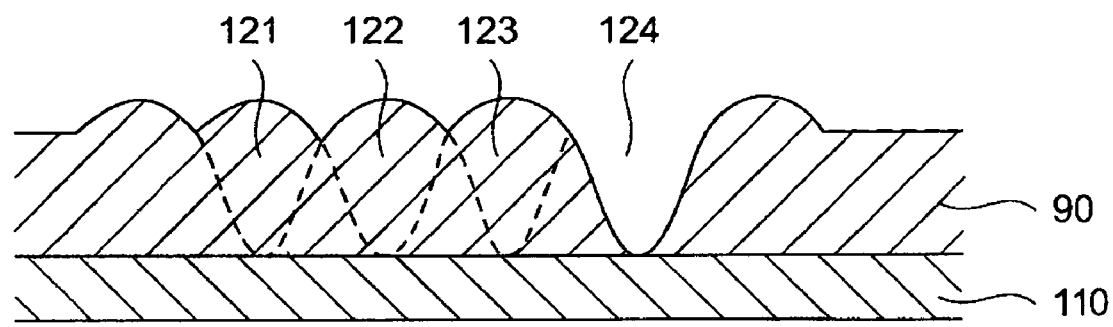
FIG. 5 is a cross-sectional view of the storage medium after a selective erase operation.
Figure 6:
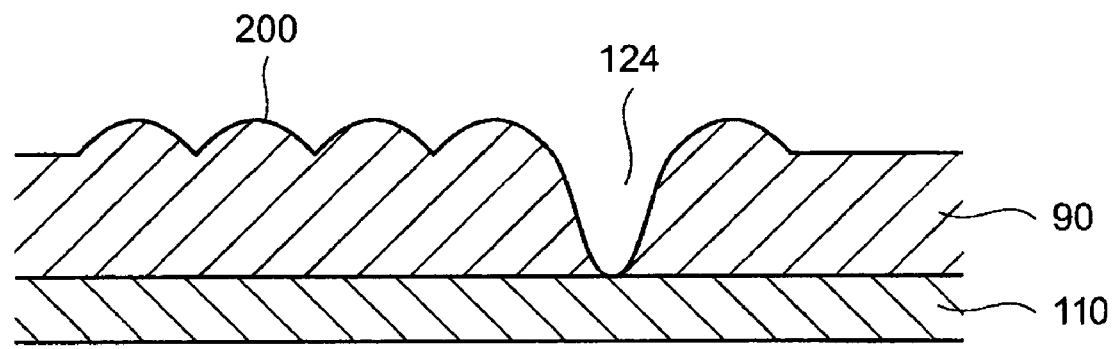
FIG. 6 is another cross-sectional view of the storage medium after a selective erase operation.

Turning now to FIG. 5, in a preferred embodiment of the present invention, recorded data bits are selectively erased by forming new pits 121–124 overlapping each other over prerecorded data to be erased to substantially level the surface of the polymer layer 90. This is achieved, in particularly preferred embodiments of the present invention, by performing the aforementioned write operation to overwrite pits to be erased with a greater density of new pits 121–124 overlapping each other so that each new pit effectively erases the immediately preceding pit. Referring to FIG. 6, the overlapping new pits 121–124 merge with each other and the pit to be erased 120 to substantially level the surface of the polymer layer 90. As mentioned earlier, the erasure need not be total. A series of ripples 200 may be left in the surface of the polymer layer 90. It is sufficient that an erased bit is not detected as a data bit during a read operation. This will of course depend on data reading sensitivity. Referring back to FIG. 3, the controller 210 is operable in an erase mode to control formation of the new pits 121–124. Returning to FIG. 5, in some embodiments of the present invention, it may be acceptable for the last new bit in a sequence written to erase an unwanted data sequence, such as the bit represented by new pit 124 for example, to form part of a new data sequence to be recorded. In other embodiments of the present invention, the density at which new bits are written to erase unwanted bits may be such that no new bits remain recorded in the surface.

Figure 7:
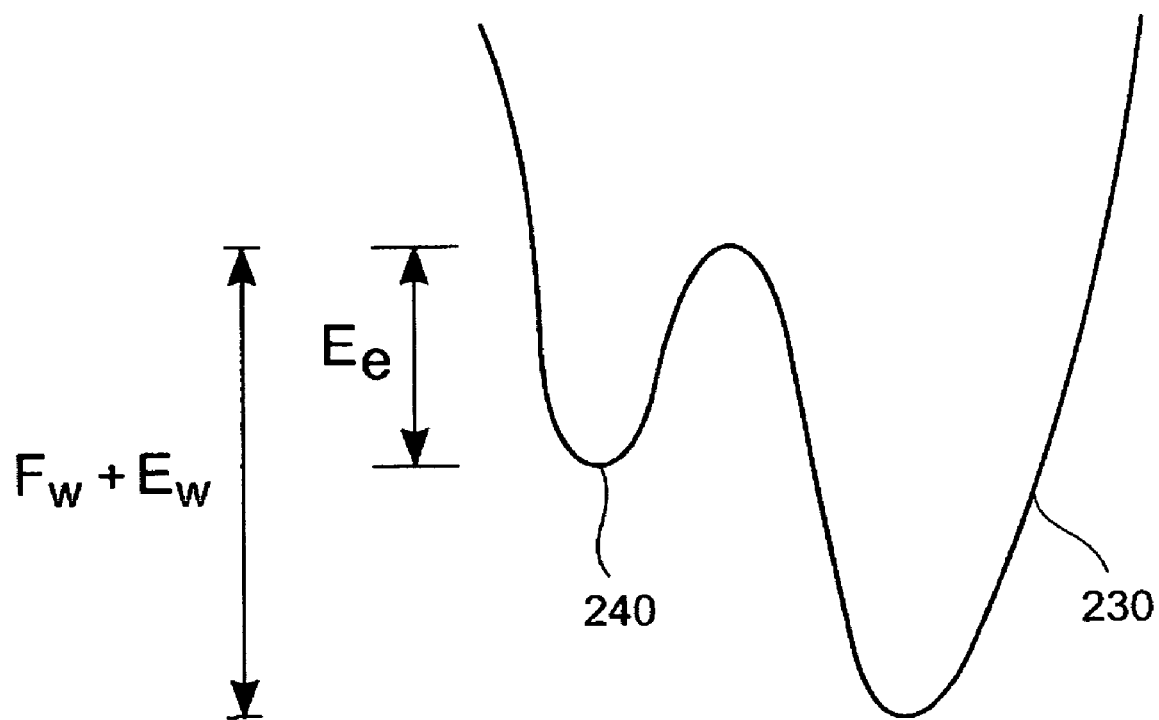
FIG. 7 is an energy diagram of the surface of the storage medium.
Figure 8:
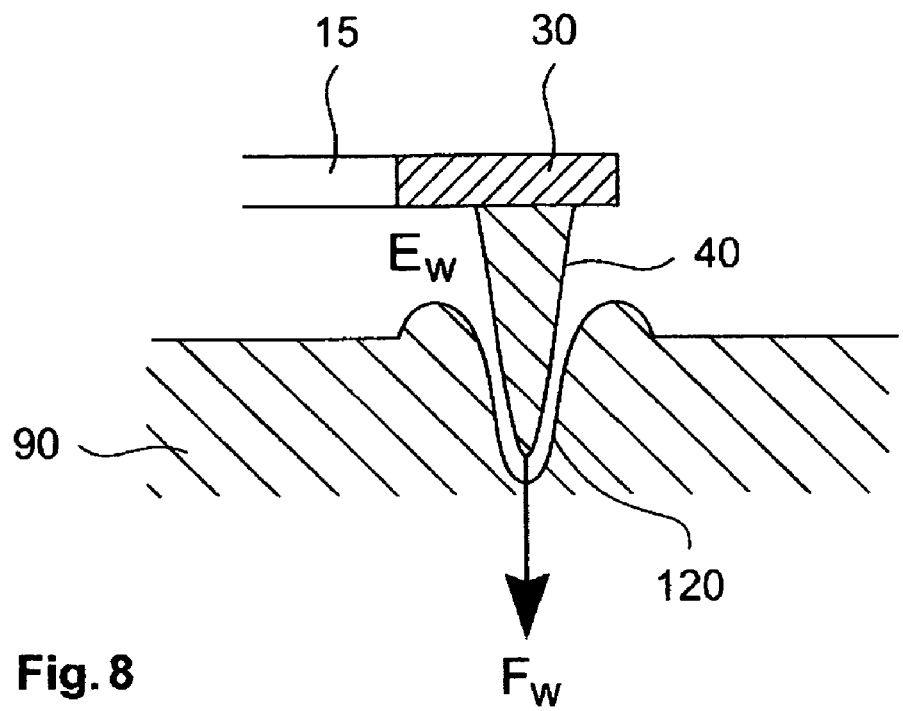
FIG. 8 is a cross-sectional view of the storage medium during a write operation; and, FIG. 9 is a cross-sectional view of the storage medium during a selective erase operation.
Figure 9:
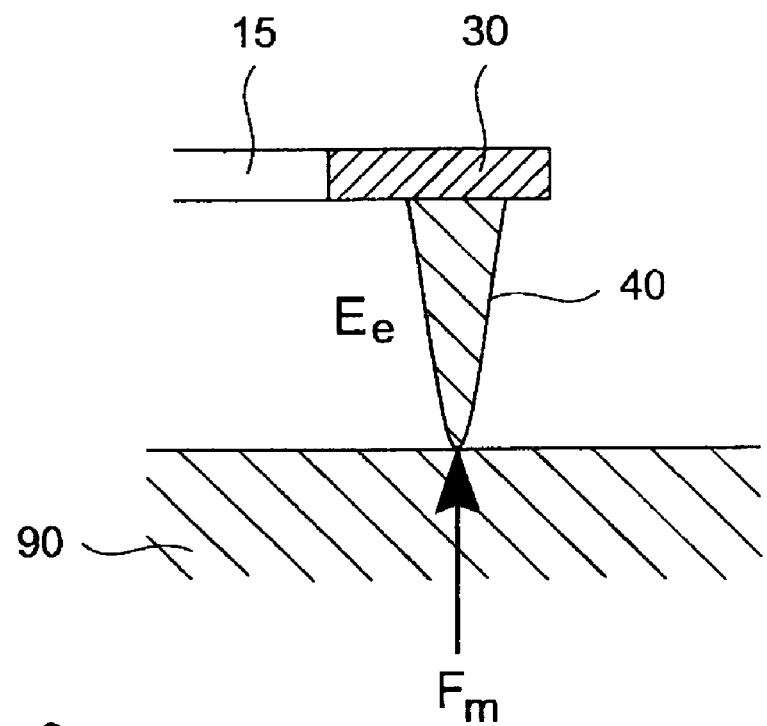

With reference to FIG. 7, the surface of the polymer layer 90 has a stable or ground state 230 and a metastable state 240. Applying a combination of force $F_w$ and energy $E_w$ to the surface via the tip 40 deforms the surface into its metastable state 240 at the point of contact with the tip 40. Referring now to FIGS. 7 and 8 in combination, in a preferred embodiment of the present invention, a data bit written at a location on the surface by positioning the tip 40 at the location and applying a combination of force $F_w$ and energy $E_w$ to the surface via the tip 40 to deform the surface at the location. With reference to FIG. 9, the data bit is then erased by positioning the tip 40 in deformation and applying energy $E_e$ to the surface via the tip 40. Energy $E_e$ may be less than that required to write a data bit onto the surface but greater than that required to read a data bit recorded in the surface. Alternatively, energy $E_e$ may be similar in magnitude to energy $E_w$. Either way, energy $E_e$ is sufficient to relax the surface from the metastable stable 240 to the stable state 230. In the erase operation, force $F_w$ is reduced and may, in some embodiments of the present invention, be removed altogether. The relief of force $F_w$ may be implemented via the transducer 220. With the force $F_w$ relieved, and energy $E_e$ applied to excite molecules in the deformed surface, intermolecular forces $F_m$ in the surface are sufficient to push the tip 40 out as the surface relaxes into its stable state. As indicated earlier, the different combinations of energy and force required for reading, writing, and selective erasing operations are provided to the array by the controller 210.

In preferred embodiments of the present invention herein before described, energy in the form of heat is applied to the surface via the tip 40 during writing, reading, and selective erasing operations. However, other embodiments of the present invention may impart energy in different forms to the surface during such operations.

The invention claimed is:

1. A method for erasing data recorded in a data storage device in which a data bit is originally written onto a polymeric surface carried by a silicon substrate by applying a first combination of heat energy and mechanical force to the polymeric surface via a tip to form a pit in the surface representative of the data bit by local deformation of the polymeric surface, the method comprising applying a write current to the tip to heat the tip to a temperature of the order of 700 degrees centigrade level sufficient to locally deform the polymer layer thereby causing the tip to indent the surface of the polymer layer and leave a pit of a diameter of about 40 nm and surrounded by a ring of polymer substrate material raised above the polymer layer and applying a second combination of energy and mechanical force via the tip to prerecorded pits of the polymeric surface to be erased, the second combination being different to the first combination, and forming new pits overlapping pits representative of prerecorded data to be erased to substantially level the polymeric surface by performing the write operation to overwrite pits to be erased with a greater density of new pits overlapping each other so that each new pit erases the immediately preceding pit, the overlapping new pits merging with each other and the pre-recorded pit to be erased to substantially level the polymer surface to a level where the erased, pre-recorded bit is not detected as a data bit during a read operation.

2. A method as claimed in claim 1, wherein the force applied in the first combination is greater than the force applied in the second combination.

3. A method as claimed in claim 2, wherein the energy applied in the first combination is greater than the energy applied in the second combination.

4. A method as claimed in claim 1, wherein the forming of the new pits comprises offsetting the new pits relative to the deformations representative of the prerecorded data to be erased.

5. A method as claimed in claim 4, wherein the forming of the new pits comprises forming a line of new pits in which each pit overlaps the immediately preceding pit.

6. A data processing system comprising: a polymeric data storage surface carried on a silicon substrate; a tip in contact with the polymeric surface and moveable relative thereto; and a controller operable, in a write mode, to apply a first combination of thermal energy and mechanical force to the polymeric surface via the tip to form a pit in the polymeric surface representative of the data bit by local deformation of the polymeric surface and, in an erase mode, to apply a second combination of thermal energy and mechanical force via the tip to prerecorded pits of the polymeric surface to be erased, the second combination being different to the first combination, and to control the tip to form new pits with a greater density of new pits overlapping each other, the overlapping new pits merging with each other and the pre-recorded pit to be erased to substantially level the polymer surface to a level where the erased pit was, so that each new pit erases the immediately preceding pit, the new pits overlapping pits representative of prerecorded data to be erased to substantially level the polymeric surface.

7. A system as claimed in claim 6, wherein the force applied in the first combination is greater than the force applied in the second combination.

8. A system as claimed in claim 7, wherein the energy applied in the first combination is greater than the energy applied in the second combination.

9. A system as claimed in claim 6, wherein the controller is operable to control offset of the new pits relative to the deformations representative of the prerecorded data to be erased.

10. A system as claimed in claim 9, wherein the controller is operable to control to the tip to form a line of new pits in which each pit overlaps the immediately preceding pit.

11. A system as claimed in claim 10, wherein the controller is operable to control offset the new pits relative to the deformations representative of the prerecorded data to be erased.

12. A system as claimed in claim 11, wherein the controller to operable to control to the tip to form a line of new pits in which each pit overlaps the immediately preceding pit.

* * * * *